United States Patent
Wang et al.

(10) Patent No.: US 10,461,923 B2
(45) Date of Patent: Oct. 29, 2019

(54) MULTIVARIATE SIGNATURE METHOD FOR RESISTING KEY RECOVERY ATTACK

(71) Applicant: Shaanxi University of Science & Technology, Xi'an, Shaanxi Province (CN)

(72) Inventors: Xin Wang, Xi'an (CN); Bo Yang, Xi'an (CN); Jian Li, Xi'an (CN); Hua Wu, Xi'an (CN)

( * ) Notice: Subject to any disclaimer, the term of this patent is extended or adjusted under 35 U.S.C. 154(b) by 287 days.

(21) Appl. No.: 15/640,458

(22) Filed: Jul. 1, 2017

(65) Prior Publication Data
US 2018/0006803 A1 Jan. 4, 2018

(30) Foreign Application Priority Data
Jul. 1, 2016 (CN) .......................... 2016 1 0510658

(51) Int. Cl.
*H04L 9/00* (2006.01)
*H04L 9/08* (2006.01)
*H04L 9/30* (2006.01)

(52) U.S. Cl.
CPC .............. *H04L 9/004* (2013.01); *H04L 9/002* (2013.01); *H04L 9/0894* (2013.01); *H04L 9/3093* (2013.01); *H04L 9/005* (2013.01); *H04L 9/0816* (2013.01); *H04L 9/0861* (2013.01); *H04L 2209/127* (2013.01)

(58) Field of Classification Search
CPC ....... H04L 9/004; H04L 9/3093; H04L 9/002; H04L 9/0894; H04L 2209/127; H04L 9/0861; H04L 9/0816; H04L 9/005; H04L 9/00; H04L 9/08
USPC .................................. 380/30, 1; 713/150, 182
See application file for complete search history.

(56) References Cited

U.S. PATENT DOCUMENTS

| | | | | |
|---|---|---|---|---|
| 5,634,004 A | * | 5/1997 | Gopinath | .......... G06F 15/17375 710/317 |
| 2005/0271207 A1 | * | 12/2005 | Frey | ........................ H04L 9/001 380/263 |
| 2018/0278426 A1 | * | 9/2018 | Tang | ........................ H04L 9/083 |

* cited by examiner

*Primary Examiner* — Ashokkumar B Patel
*Assistant Examiner* — Quazi Farooqui
(74) *Attorney, Agent, or Firm* — Novoclaims Patent Services LLC; Mei Lin Wong

(57) ABSTRACT

A multivariate signature method for resisting key recovery attack, which establishes a new signature verification condition by adding additional value of signature. The verification condition implies verification of internal information x and y, thereby effectively resisting key recovery attack generated by the existence of equivalence key. Specifically, the method includes the three stages of data preprocessing, signature generation and signature verification. The invention is a signature authentication method based on polynomial equations of a plurality of variables in a finite field, which can effectively resist the key recovery attack, provide the basic technical support for the information security and the establishment of the trust system in the quantum computer era, and provide a secure digital signature option in the quantum era. The present invention is especially suitable for use under application condition which has limited storage and processing time, such as smart cards, wireless sensor networks and dynamic RFID tags.

2 Claims, 2 Drawing Sheets

MULTIVARIATE SIGNATURE METHOD FOR RESISTING KEY RECOVERY ATTACK

CROSS REFERENCE OF RELATED APPLICATION

This application claimed priority of one foreign application which is filed in China: application number 201610510658.6 and filing date Jul. 1, 2016. The contents of this specification, including any intervening amendments thereto, are incorporated herein by reference.

BACKGROUND OF THE PRESENT INVENTION

Field of Invention

The present invention belongs to the field of information security and relates to signature verification with multivariate public key and message, and more particularly to a multivariate signature method which is capable of resisting key recovery attack.

Description of Related Arts

Digital signature is a method used to identify digital information and is one of the main applications of public key cryptographic system, which is also known as public key digital signature. In the public key cryptography system, the principle of digital signature technology is mainly that a message is signed by a private key signature (encrypted) of a sender, and is sent to a recipient together with the original text. The recipient uses the public key of the sender to decrypt the signature and compares the value of the solution with the original text: if they are the same, the recipient will determine the signature to be legitimate and accepted; if not, the recipient will determine the signature to be illegal signature and rejected. Therefore, digital signatures are often made up of two algorithms, one for signatures and one for authentication, and both parties is capable of processing signature and verification of digital information (messages) in a public network environment.

The security of digital signatures requires to make sure that the source of the message is correct and cannot be forged by others.

At present, for digital signature which is applied to the message, the majority of its security theory is based on the difficulty of large integer decomposition in Number Theory. However, in 1995, an American scientist Peter Shor has proposed a quantum decomposition algorithm, which is capable of processing decomposition of a large number of prime factors and discrete logarithm problems in polynomial time by using the parallelism of quantum computation. In other words, the emergence of quantum computers poses a serious threat to the security of existing digital signatures which are based on traditional cryptographic systems.

The multivariable public key system is a cryptosystem designed on the finite field which is based on the problem solving of multivariable nonlinear equations, its security is based on solving a set of multivariable polynomial equations that are an NP-C difficult problem and is currently considered as an alternative secure cryptographic system in the quantum era. The signature program FLASH, which is proposed in 2004, was selected in the European password plan NRSSIE and became one of the great potential technologies in cryptographic research.

As a new research direction, a multivariable system has the advantages of higher efficiency, higher security and easier hardware implementation when comparing to the system based on number theory in the traditional signature system. However, the existing multivariate signature system has the following problems: the verification conditions of the standard signature model depend only on the public key and only single verification is involved, that is to say, under a key recovery attack, even if the forger does not know the real legal private key, it is also possible to obtain a "legal" signature that can be verified by the public key by reversing the equivalent key corresponding to the public key through the sophisticated structure of the public key. The main reason for this is that signature verification does not involve verification of internal private key information. At present, in the signature system which is based on multivariable public key cryptography, there is no secure multivariate signature scheme which can resist key recovery attack. Therefore, it is necessary to take these issues into account and try to avoid them when designing a new multivariate signature scheme.

SUMMARY OF THE PRESENT INVENTION

In order to overcome the above-mentioned drawbacks in the existing technologies, it is an object of the present invention to provide a more secure multi-variable signature method which can resist key recovery attacks. The method is a signature authentication method based on polynomial equations of a plurality of variables in a finite field. This method can effectively resist the key recovery attack and provide the basic technical support for the information security and the establishment of the trust system in the quantum computer era, and is a secure digital signature option in the quantum era. The method is especially suitable for use under application condition which has limited storage and processing time, such as smart cards, wireless sensor networks and dynamic RFID tags According to the present invention, the foregoing and other objects and advantages are attained by adding additional value of signature to establish a new signature verification requirement. The verification condition requires implied verification of internal information x and y, thereby effectively resisting key recovery attack generated by the existence of equivalence key.

In particular, the present invention provides a multivariate signature method for resisting key recovery attack, which comprises the following steps:

Step 1: Selecting System Parameters

Taking a finite field F, positive integers n and m, a n-th extended field of F as $F^n$, a m-th extended field of F as $F^m$. Taking a set of multivariable quadratic polynomial equations $q_1(x_1, \ldots, x_n), \ldots, q_m(x_1, \ldots, x_n)$ from $F^n$ to $F^m$ which is recorded as Q, and then Q represents a center mapping of multivariate public key cryptographic system, where an input variable is n and an output variable is m. Using $Q^{-1}$ for the inverse polynomial of polynomial Q, where $Q^{-1}$ is held by a legitimate user. Taking another reversible affine transformation S and T on $F^n$ and $F^m$ as a secret key and their inverse polynomials are denoted as $S^{-1}$ and $T^{-1}$ respectively. Then randomly selecting a set of n number n-quaternary multivariable polynomial equations $(g_1(x_1, \ldots, x_n), \ldots, g_n(x_1, \ldots, x_n))$ on $F^n$, where its polynomial vector is denoted as G, i.e. $G(x_1, \ldots, x_n) = (g_1(x_1, \ldots, x_n), \ldots, g_n(x_1, \ldots, x_n))$, and two unidirectional irreversible polynomial equations set H and $\tilde{H}$. A user secret key consists of three parts, S, T and G. The H and $\tilde{H}$ are secret selection of a credible third party that are only used for generating the public key. And the inverse polynomial of G is expressed as $G^{-1}$. The corresponding public key consists of five polynomials, which are: $P=T\circ Q\circ S$, $H\circ G^{-1}\circ S$, $H\circ S$, $\tilde{H}\circ Q\circ G^{-1}\circ S$, $\tilde{H}\circ T^{-1}$ respectively. The operator $\circ$ represents a synthesis of operation, processing substituting calculation from left to right in order, for example $P(x)=T\circ Q\circ S(x)=T(Q(S(x)))$;

Step 2: generating signature a coding of a known message M is a vector $(u_1, \ldots, u_m)$ which is denoted as u, a signature is generated by the following steps:

(2.1) generating a forward signature (2.1a) substituting $u=(u_1, \ldots, u_m)$ which is the coding of message M into $T^{-1}$ using the secret key $T^{-1}$, obtaining $(y_1, \ldots, y_m)$, which is denoted as y;

(2.1b) substituting the obtained result y into the inverse polynomial $Q^{-1}$ of the center mapping Q, obtaining $(x_1, \ldots, x_n)$, which is denoted as x;

(2.1c) substituting the obtained result x into the inverse polynomial $S^{-1}$ of the secret key S, obtaining $(v_1, \ldots, v_n)$, which is denoted as v, then v is the forward signature of the coding u of the message M;

(2.2) generating a backward signature (2.2a) substituting the obtained result x into the secret key G, obtaining $G(x_1, \ldots, x_n), =(g_1(x_1, \ldots, x_n), \ldots, g_n(x_1, \ldots, x_n))=(g_1, \ldots, g_n)$, which is denoted as g;

(2.2b) substituting the obtained result g into the inverse polynomial $S^{-1}$ of the secret key S, obtaining $S^{-1}(g)=S^{-1}\circ G(x)=(v_{g1}, \ldots, v_{gn})$, which is denoted as $v_g$, then $v_g$ is the backward signature of the coding u of the message M;

(2.3) processing a cascade of the forward signature and the back signature $v\|v_g$, which is the signature of the coding u of the message M;

Step 3, verifying the signature (3.1) using public key P to process verification (3.1a) substituting the forward signature $v=(v_1, \ldots, v_n)$ into the public key P, obtaining $P(v_1, \ldots, v_n)=(p_1(v_1, \ldots, v_n), \ldots, p_m(v_1, \ldots, v_n))$, and recording obtained results as $u'=(u'_1, \ldots, u'_n)$;

(3.1b) determining if u' equals to the coding u of the original message M;

(3.2) using public key $H\circ S$ and $H\circ G^{-1}\circ S$ to process verification;

(3.2a) substituting the forward signature $v=(v_1, \ldots, v_n)$ into the public key $H\circ S$, obtaining $H\circ S(v)=H\circ S(v_1, \ldots, v_n)=H(S(v_1, \ldots, v_n))$, and recording obtained results as $h=(h_1, \ldots, h_n)$;

(3.2b) substituting the backward signature $v_g=(v_{g1}, \ldots, v_{gn})$ into the public key $H\circ G^{-1}\circ S$, obtaining $H\circ G^{-1}\circ S(v_g)=H\circ G^{-1}\circ S(v_{g1}, \ldots, v_{gn})=H(G^{-1}(S(v_{g1}, \ldots, v_{gn})))$, and recording obtained results as $h'=(h'_1, \ldots, h'_n)$;

(3.2c) determining if h and h' are equal;

(3.3) using public key $\tilde{H}\circ Q\circ G^{-1}\circ S$ and $\tilde{H}\circ T^{-1}$ to process verification:

(3.3a) for the coding u of the message M, substituting u into the public key $\tilde{H}\circ T^{-1}$, obtaining $\tilde{H}\circ T^{-1}(u)=\tilde{H}(T^{-1}(u))$, and recording obtained results as $\tilde{h}=(\tilde{h}_1, \ldots, \tilde{h}_n)$;

(3.3b) for the backward signature $v_g$, substituting $v_g$ into the public key $\tilde{H}\circ Q\circ G^{-1}\circ S$, obtaining $\tilde{H}\circ Q\circ G^{-1}\circ S(v_g)=\tilde{H}(Q(G^{-1}(S(v_g))))$, recording obtained results as $\tilde{h}'=(\tilde{h}'_1, \ldots, \tilde{h}'_n)$;

(3.3c) determining if $\tilde{h}$ and $\tilde{h}'$ are equal;

if (3.1b), (3.2c) and (3.3c) are true, then $v\|v_g$ is a legitimate signature of the coding u of the message M, otherwise, the signature is invalid and will be rejected.

In the step 1, all of the S, T, G are reversible affine transformation.

Compared with the existing technology, the advantageous of the present invention are as follows:

1) The present invention is based on a signature model of a multivariable public key cryptosystem, and therefore, it is resistant to conventional quantum attacks;

2) The invention is based on the public key cryptosystem of the multivariable polynomial equations on a finite field. Its operation is additive and low-order multiplication without exponential and inverse operation. Therefore, it is more efficient and secure than the traditional system which is based on number theory;

3) The signature generated by the present invention consists of two parts: a forward signature v and a backward signature $v_g$. The generation of the forward signature v requires possession of the legitimate secret key S and T, and the generation of the backward signature $v_g$ requires possession of the legitimate secret key S, G and T Accordingly, compared with the existing multivariate signature scheme which only utilizes forward signature, the present invention alleviates the danger from the attacker;

4) The signature $v\|v_g$ generated by the present invention are composed of two parts: v and $v_g$, and they are interrelated to each other. Also, v and $v_g$, are required to satisfy two hidden associated verification: $\tilde{S}(v)=x=G^{-1}\circ S(v_g)$ and $T^{-1}(u)=y=Q\circ G^{-1}\circ S(v_g)$ of the secret keys S, G and T These two verifications are established if and only if they have the correct secret keys S, G and T. The backward signature cannot be obtained solely by the possession of public key in the absence of the legitimate secret keys S, G and T. Therefore, compared with the existing signature verification model which only requires u to satisfy the public key P, the present invention includes a backward signature verification, which is effective against key recovery attacks and hence it is more secure.

Further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
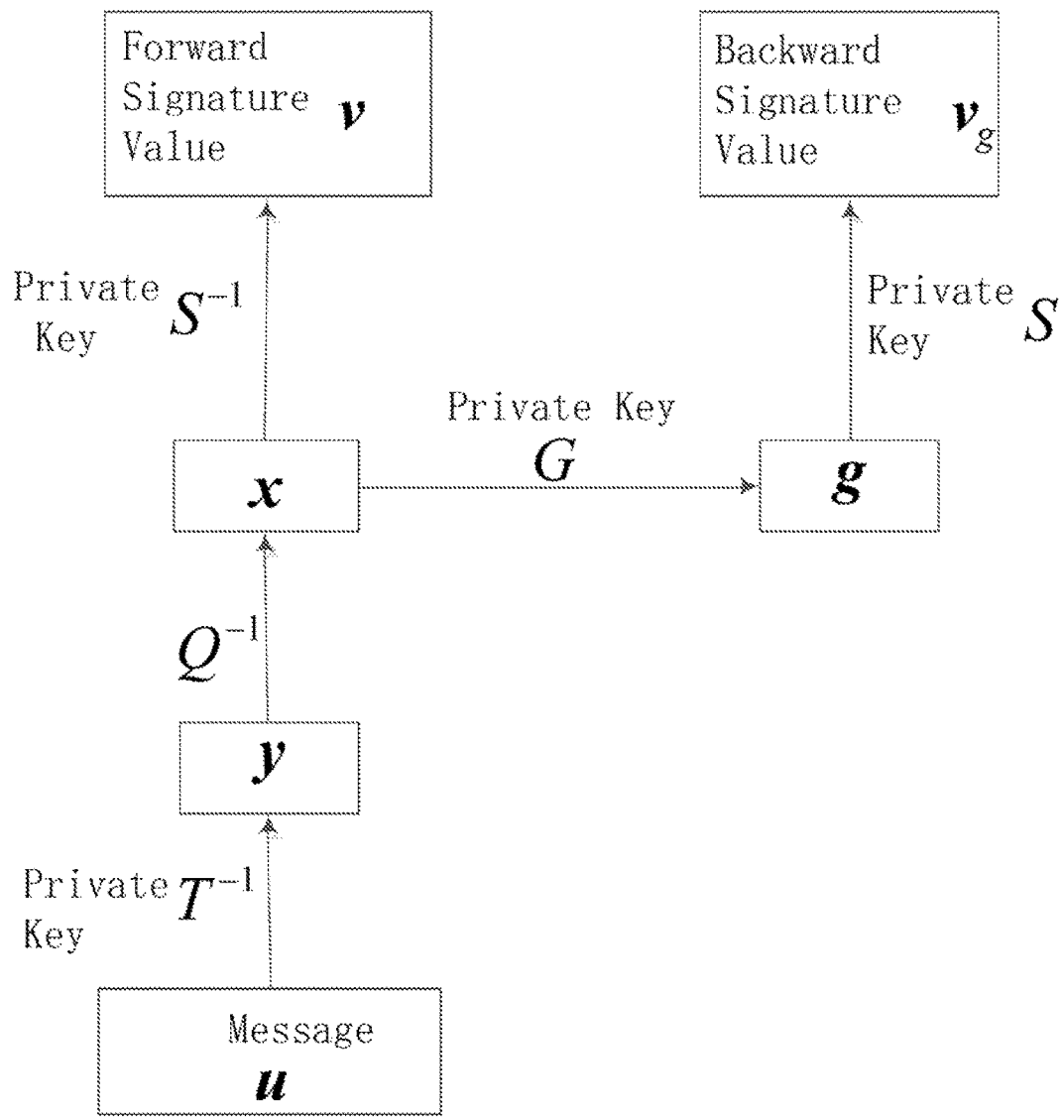
FIG. 1 is a schematic diagram, showing the principle of the signature generation according to a preferred embodiment of the present invention.

The preferred embodiments of the present invention are further described in detail with reference to the accompanying drawings and embodiments.

I. The Mathematical Theory Applied by the Present Invention (1) Finite Field

A finite field is a set of finite elements that contain two operations pf addition and multiplication, and that satisfies the properties of both addition and multiplication with the combined law, the exchange law, the inverse element of nonzero element, and the distribution rate of multiplication to addition. The number of elements in the field is called the order of the domain. The q-order finite field is often recorded as F=GF(q) or abbreviated as F. The operations on a finite field are modulo operations.

Transformation

F is a finite field, $(y_1, \ldots, y_n)=f(x_1, \ldots, x_n)$, $x_i, y_i \in F$ is call a transformation, which refers to the existence of rules of changes which cause $(x_1, \ldots, x_n)$ to process through the rules of changes to become $(y_1, \ldots, y_n)$, the rules of changes is recorded as f and called transformation.

Multivariate Problem

Multivariate problems are also referred to as multivariable quadratic-difficult problems. Since the security of the multivariable public key cryptosystem is based on solving a set of multivariable nonlinear polynomial equations on a finite field:

$$p_1(x_1, \ldots, x_n)=p_2(x_1, \ldots, x_n)=\ldots=p_m(x_1, \ldots, x_n)=0,$$

the problem to be solved is an NP-C problem, wherein the coefficients and variables of $p_i$ are taken from the finite field F. Usually, the equation $p_i$ is quadratic. Based on the scheme of multivariable problem construction, the pre-security basis comes from the difficulty of direct cracking the public key quadratic equation, that is, the known public-key solution equations are a nondeterministic polynomial time-complete (NP-C) difficult problem.

II. Implementation Method

Step 1: selecting system parameters:

Taking a finite field F, positive integers n and m, a n-th extended field of F as $F_n$, a m-th extended field of F as $F_m$, taking a set of multivariable quadratic polynomial equations $q_1(x_1, \ldots, x_n), \ldots, q_m(x_1, \ldots, x_n)$ from $F^n$ to $F^m$ which is recorded as Q and then Q represents a center mapping of multivariate public key cryptographic system, where an input variable is n and an output variable is m, using $Q^{-1}$ for the inverse polynomial of polynomial Q, where $Q^{-1}$ is held by a legitimate user, taking another reversible affine transformation S and T on $F^n$ and $F^m$ as a secret key and their inverse polynomials are recorded as $S^{-1}$ and $T^{-1}$ respectively, then randomly selecting a set of n number n-quaternary multivariable polynomial equations $(g_1(x_1, \ldots, x_n), \ldots, g_n(x_1, \ldots, x_n))$ on $F_n$, where its polynomial vector is recorded as G, that is $G(x_1, \ldots, x_n)=(g_1(x_1, \ldots, x_n), \ldots, g_n(x_1, \ldots, x_n))$, and two unidirectional irreversible polynomial equations set H and $\tilde{H}$, wherein a user secret key consists of three parts, S, T and G, wherein H and $\tilde{H}$ are secret selection of a credible third party which is only used for generating public key, where the inverse polynomial of G is expressed as $G^{-1}$, the corresponding public key consists of five polynomials, which are: $P=T \circ Q \circ S$, $H \circ G^{-1} \circ S$, $H \circ S$, $\tilde{H} \circ Q \circ G^{-1} \circ S$, $\tilde{H} \circ T^{-1}$ respectively, where the operator $\circ$ represents a synthesis of operation, which is, processing substituting calculation from left to right in order.

Step 2: generating signature a coding of a known message M is vector $(u_1, \ldots, u_m)$ which is recorded as u, a signature is generated by the following steps:

(2.1) generating a forward signature:

(2.1a) substituting $u=(u_1, \ldots, u_m)$ which is the coding of message M into $T^{-1}$ by the secret key $T^{-1}$, obtaining $(y_1, \ldots, y_n)$, which is recorded as y;

(2.1b) substituting the obtained result y from the above step (2.1a) into the inverse polynomial $Q^{-1}$ of the center mapping Q, obtaining $(x_1, \ldots, x_n)$, which is recorded as x;

(2.1c) substituting the obtained result x from the above step (2.1b) into the inverse polynomial $S^{-1}$ of the secret key S, obtaining $(v_1, \ldots, v_n)$, which is recorded as v, then v is the forward signature of the coding u of the message M.

(2.2) generating a backward signature (2.2a) substituting the obtained result x from the above step (2.1b) into the secret key G, obtaining $G(x_1, \ldots, x_n)=(g_1(x_1, \ldots, x_n), \ldots, g_n(x_1, \ldots, x_n))=(g_1, \ldots, g_n)$, which is recorded as g;

(2.2b) substituting the obtained result g from the above step (2.2a) into the inverse polynomial $S^{-1}$ of the secret key S, obtaining $S^{-1}(g)=S^{-1} \circ G(x)=(v_{g1}, \ldots, v_{gn})$, which is recorded as $v_g$, then $v_g$ is the backward signature of the coding u of the message M;

(2.3) processing a cascade of the forward signature and the back signature $v \| v_g$, which is the signature of the coding u of the message M.

Figure 2:
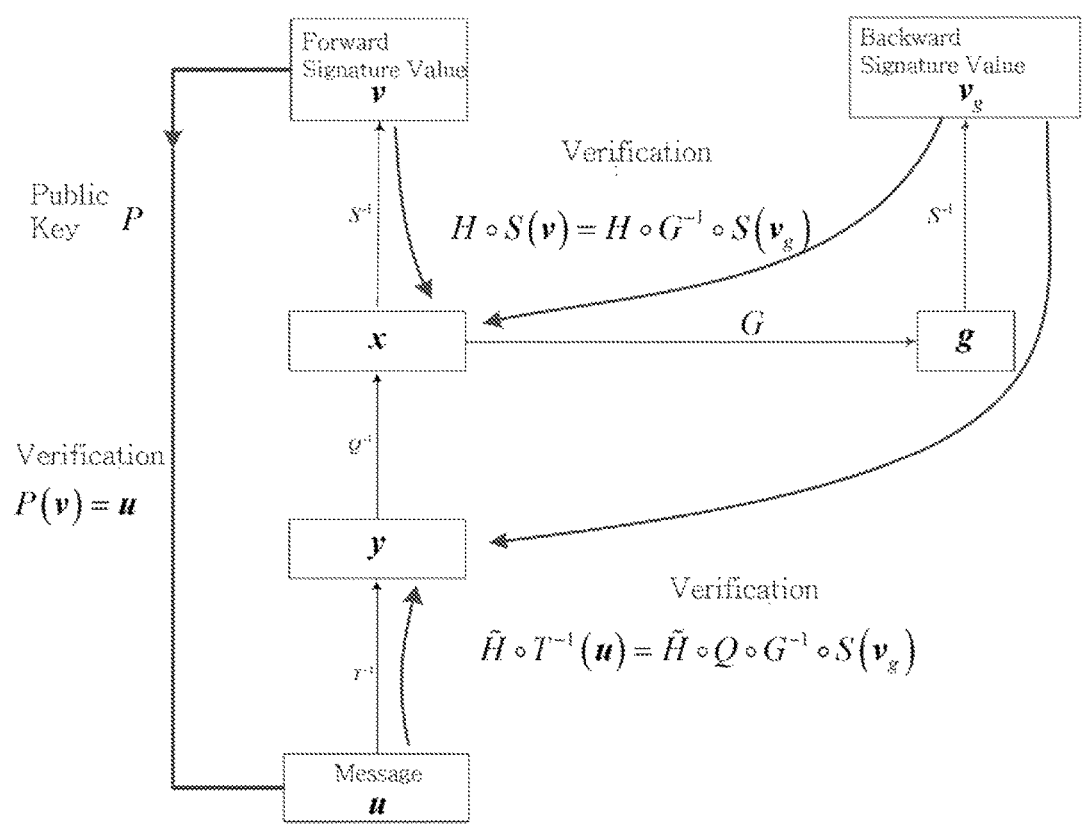
FIG. 2 is a schematic diagram, showing the principle of the signature verification according to a preferred embodiment of the present invention.

Referring to FIG. 2 of the drawings, the implementation of signature verification according to the present invention is as follows:

Step 3, verifying the signature:

(3.1) using public key P to process verification.

(3.1a) substituting the forward signature $v=(v_1, \ldots, v_n)$ into the public key P, obtaining $P(v_1, \ldots, v_n)=(p_1(v_1, \ldots, v_n), \ldots, p_m(v_1, \ldots, v_n))$, obtaining and recording results as $u'=(u'_1, \ldots, u'_n)$.

(3.1b) determining if u' equals to the coding u of the original message M.

(3.2) using public key H S and H S to process verification.

(3.2a) substituting the forward signature $v=(v_1, \ldots, v_n)$ into the public key $H \circ S$, obtaining $H \circ S(v)=H \circ S(v_1, \ldots, v_n)=H(S(v_1, \ldots, v_n))$, and recording obtained results as $h=(h_1, \ldots, h_n)$;

(3.2b) substituting the backward signature $v_g=(v_{g1}, \ldots, v_{gn})$ into the public key $H \circ G^{-1} \circ S$, obtaining $H \circ G^{-1} \circ S(v_g)=H \circ G^{-1} \circ S(v_{g1}, \ldots, v_{gn})=H(G^{-1}(S(v_{g1}, \ldots, v_{gn})))$, and recording obtained results as $h'=(h'_1, \ldots, h'_n)$;

(3.2c) determining if h and h' are equal.

(3.3) using public key $\tilde{H} \circ Q \circ G^{-1} \circ S$ and $\tilde{H} \circ T^{-1}$ to process verification.

(3.3a) for the coding u of the message M, substituting u into the public key $\tilde{H} \circ T^{-1}$, obtaining $\tilde{H} \circ T^{-1}(u)=\tilde{H}(T^{-1}(u))$, and recording obtained results as $\tilde{h}=\tilde{h}_1, \ldots, \tilde{h}_n)$;

(3.3b) for the backward signature $v_g$, substituting $v_g$ into the public key $\tilde{H} \circ Q \circ G^{-1} \circ S$, obtaining $\tilde{H} \circ Q \circ G^{-1} \circ S(v_g)=\tilde{H}(Q(G^{-1}(S(v_g))))$, recording obtained results as $\tilde{H}'=(\tilde{h}'_1, \ldots, \tilde{h}'_n)$;

(3.3c) determining if $\tilde{h}$ and $\tilde{h}'$ are equal.

If (3.1b), (3.2c) and (3.3c) are true, then $v \| v_g$ is a legitimate signature of the coding u of the message M, otherwise, the signature is invalid and rejected.

The present invention provides a signature scheme based on a finite field, which is a correct scheme and is capable of resisting a key recovery attack.

The Correctness of the Signature

Let the recipient receives the signature $V \| v_g$. If the signature is progressively generated as described above and does not change during transmission, then due to:

(1) Since the forward signature v is generated by sequentially processing the coding of message M by private key $T^{-1}$, center mapping $Q^{-1}$ and private key $S^{-1}$, that is $v=(v_1, \ldots, v_n)=S^{-1} \circ Q^{-1} \circ T^{-1}(u_1, \ldots, u_m)$, then obviously, by substituting the resulting forward signature v into the public key P, we have established $$P(v) = P(S^{-1} \circ Q^{-1} \circ T^{-1}(u_1, \ldots, u_m))$$
$$= P \circ S^{-1} \circ Q^{-1} \circ T^{-1}(u)$$
$$= T \circ Q \circ S \circ S^{-1} \circ Q^{-1} \circ T^{-1}(u) = u,$$

i.e. the verification formula (3.1b) is established.

(2) From the backward signature $v_g = S^{-1} \circ G(x_1, \ldots, x_n)$ and the forward signature $v = S^{-1}(x_1, \ldots, x_n)$, then obviously, $S(v) = (x_1, \ldots, x_n) = G^{-1} \circ S(v_g)$, and then we obtain $H \circ S(v)$ and $H \circ G^{-1} \circ S(v_g)$ are equal, i.e. the verification formula (3.2c) is established.

(3) From the backward signature $v_g = S^{-1} \circ G(x_1, \ldots, x_n)$ and the coding u of message M, then $Q \circ G^{-1} \circ S(v_g) = y = T^{-1}(u)$, and then we have $H \circ G^{-1} \circ S(v_g) = H \circ S(v)$ established, i.e. the verification formula (3.3c) is established.

Anti-Forgery of the Signature

The present invention provides a signature scheme, which is based on a multivariable polynomial, is unforgeable to the signature forgery attack of known public key. In the following, it is theoretically proven from the cryptographic theory that the digital signature scheme of the present invention can resist signature forgery attacks, and in particular, key recovery attacks against multivariable cryptographic systems.

Proof: It is well known that the multivariable system has an "equivalent key" characteristic, that is, the same public key corresponds to multiple private keys, which is also known as "Key Redundancy", and is reflected as follows: for two different private keys (T, Q, S) and (T', Q, S'), we have $T \circ Q \circ S = P = T' \circ Q \circ S'$. Therefore, key recovery attack refers to as long as the attacker in attacking a multi-variable system gets an equivalent private key (T', Q, S), even if the correct private key is not obtained (T, Q, S), the attack can also success. The model provided by the present invention can effectively defend against the attack. The proof is provided as follows:

If an attacker wants to successfully forge a signature, there must be a forward signature v and a backward signature $v_g$ that can be established through (3.1b), (3.2c) and (3.3c). However, even if the forger (the attacker) can obtain an equivalent key (T', Q, S') through a key recovery attack to obtain a forward signature, which is recorded as $\hat{v}$, and a backward signature which is recorded as $\hat{v}_g$, the verification of (3.1c) and (3.2c) cannot be established. This is because the public keys $H \circ G^{-1} \circ S$ and $H \circ S$ set a limitation that the private key for generating the signature must be S and cannot be the equivalent key, such as $\hat{S}$; the public keys $\tilde{H} \circ Q \circ G^{-1} \circ S$ and $\tilde{H} \circ T^{-1}$ then set a limitation that the private key for generating the signature must be T and cannot be the equivalent key, such as $\tilde{T}$. Accordingly, in the absence of the correct private keys S and T, even if the forger can generate a signature by key recovery attack through equivalent key, the signature cannot be validated by the verification of (3.2c) and (3.3c) because the signature is not generated by the correct private keys S and T. If the attacker randomly guesses a forward signature v and a backward signature $v_g$, then since both $\hat{v}$ and $\hat{v}_g$ are n-vector derived from the q-order finite field, so the probability of success is only $$\frac{1}{q^{2n}} \to 0$$

(q is the order of the finite field).

From above, the present invention is effective against an equivalent key recovery attack against a multivariate signature system.

III. Preferred Embodiment

Select center mapping of HFE (Hidden Field Equations) multi-variable system as an example, the signature scheme is as follows:

(1) HFE embodiment

Let $\mathbb{F}$ be a q-order finite field, $\mathbb{E}$ be the n-order extension of $\mathbb{F}$, $\pi: \mathbb{E} \to \mathbb{F}^n$ be the isomorphic mapping of the extended domain to the vector space, where $\pi(a_0 + a_1 x + \ldots + a_{n-1} x^{n-1}) = (a_0, \ldots, a_{n-1})$. Center mapping:

$$\tilde{Q}(X) := \sum_{\substack{0 \leq i,j \leq d \\ q^i + q^j \leq d}} C_{i,j} X^{q^i + q^j} + \sum_{\substack{0 \leq k \leq d \\ q^k \leq d}} B_k X^{q^k} + A,$$

where $i, j \in \mathbb{N}$, frequency is $d \in \mathbb{N}$, ($d \in \mathbb{N}$ is the degree, $\mathbb{N}$ is integer) $C_{ij} \in \mathbb{E}$ is quadratic coefficient, $B_k \in \mathbb{E}$ is a monomial coefficient, $A \in \mathbb{E}$ is a constant, that these coefficients are randomly selected and the degree must be less than the parameter d.

Q is a reversible transformation which can be obtained by a variant of the Berlekamp algorithm on the domain, the complexity of this step is $O(nd^2 \log d + d^3)$, therefore the parameter d cannot be too large. The center mapping $Q(x_1, \ldots, x_n)$ is the mapping from $\mathbb{F}$ to $\mathbb{F}$, which is:

$$Q(x_1, \ldots, x_n) = (q_1(x_1, \ldots, x_n), \ldots, q_n(x_1, \ldots, x_n)) = \pi \circ Q \circ \pi^{-1}(x_1, \ldots, x_n),$$

Wherein $q_i(x_1, \ldots, x_n) = 1, \ldots, m$ is the quadratic polynomial equation of n variables. Let S and T be two random reversible affine transformation on $\mathbb{F}_n$, then define $P(x_1, \ldots, x_n) = (p_1(x_1, \ldots, x_n), \ldots, p_n(x_1, \ldots, x_n)) = R \circ Q \circ S(x_1, \ldots, x_n)$. Here, all of the polynomials is a second-degree polynomial.

The system is used as a signature algorithm and the process is as follows.

Alice wants to send Bob a message $(v_1, \ldots, v_n)$ signed by herself. First, she uses her private key $S_{Alice}$, $T_{Alice}$ for the coding $(u_1, \ldots u_m)$ of message M to carry out signature: (I) calculate $(y_1, \ldots, y_m) = T^{-1}_{Alice}(u_1, \ldots, u_m)$; (II) calculate $(x_1, \ldots, x_n) = Q^{-1}(y_1, \ldots, y_m) = \pi \circ \tilde{Q}^{-1} \circ \pi^{-1}(y_1, \ldots, y_m)$; (III) calculate $(v_1, \ldots, v_n) = S^{-1}_{Alice}(x_1, \ldots, x_n)$; then send the message $(u_1, \ldots, u_m)$ and signature $(v_1, \ldots, v_n)$ together to Bob through communication network.

Bob receives the message $(u_1, \ldots, u_m)$ and the signature $(v_1, \ldots, v_n)$ together through public channel from Alice and wants to determine whether the signature is really come from Alice. So Bob found Alice's public key in the public to verify. Bob uses $P_{Alice}$ to calculate $P_{Alice}(v_1, \ldots, v_n)$ for the signature $(v_1, \ldots, v_n)$, the results is recorded as $(u'_1, \ldots, u'_m)$, then determines if the value $(u'_1, \ldots, u'_m)$ is equal to the original message $(u_1, \ldots, u_m)$, if they are equal, then the signature $(v_1, \ldots, v_n)$ is accepted, if not then rejected.

When multivariate system is used as a signature scheme, as with the traditional multivariate signature model, only the public key authentication is required and whether the user has a valid private key is not verified. The original HFE system has been cracked: in 1999, Kipins and Shamir use a recalculation method to provide an effective key recovery attack.

(2) In the followings, take Q as the center mapping of the HFE system.

Alice gives a secure signature by selecting a reversible quadratic polynomial polynomial $G_{Alice}$ as a private key and two random unidirectional irreversible polynomials H and $\tilde{H}$ as auxiliary functions.

When Alice wants to send Bob a message $(u_1, \ldots, u_m)$ signed by herself, (I) use her private key $T_{Alice}$, calculate $(y_1, \ldots, y_m) = T^{-1}_{Alice}(u_1, \ldots, u_m)$; (II) calculate $(x_1, \ldots, x_n) = Q^{-1}(y_1, \ldots, y_m) = \pi \circ \tilde{Q}^{-1} \circ \pi^{-1}(y_1, \ldots, y_m)$; (III) use private key $S_{Alice}$, calculate $(v_1, \ldots, v_n) = S^{-1}_{Alice}(x_1, \ldots, x_n)$; (IV) use private key $G_{Alice}$, calculate $G_{Alice} = G(x_1, \ldots, x_n) = (g_1(x_1, \ldots, x_n), \ldots, g_n(x_1, \ldots, x_n)) = (g_1, \ldots, g_n)$; (V) use private key $S_{Alice}$, calculate $(v_{g1}, \ldots, v_{gn}) = S^{-1}(g) = S^{-1} \circ G(x)$; (VI) cascade $(v_1, \ldots, v_n)$ and $(v_{g1}, \ldots, v_{gn})$ to obtain $v_1, \ldots, v_n \| v_{g1}, \ldots, v_{gn}$, which is the signature of the message $(u_1, \ldots, u_m)$.

Bob receives the message $(u_1, \ldots, u_m)$ and the signature $v_1, \ldots, v_n \| v_{g1}, \ldots, v_{gn}$ through public channel from Alice. Bob wants to determine whether the signature is really come from Alice. Bob found Alice's public key $P_{Alice}$, $H \circ S_{Alice}$, $H \circ G^{-1} \circ S_{Alice}$, $\tilde{H} \circ Q \circ G^{-1} \circ S_{Alice}$ and $\tilde{H} \circ T^{-1}_{Alice}$, in the public, then process verification of the signature $v_1, \ldots, v_n \| v_{g1}, \ldots, v_{gn}$:

(I) Bob uses Alice's public key $P_{Alice}$, substitute forward signature $v = (v_1, \ldots, v_n)$ into $P_{Alice}$, obtain the results and record as $(u'_1, \ldots, u'_m)$, determine whether the value $(u'_1, \ldots, u'_m)$ is equal to the original message $(u_1, \ldots, u_m)$, if they are the same, then step (II) determination is carried out, otherwise rejected the signature.

(II) Bob substitute backward signature $(v_{g1}, \ldots, v_{gn})$ into $\tilde{H} \circ Q \circ G^{-1} \circ S_{Alice}$, to obtain $\tilde{H} \circ Q \circ G^{-1} \circ S_{Alice}(v_{g1}, \ldots, v_{gn})$, the results obtained is recorded as $(\tilde{h}'_1, \ldots, \tilde{h}'_m)$; substitute the message $(u_1, \ldots, u_m)$ into public key $\tilde{H} \circ T^{-1}_{Alice}$, obtain the result $\tilde{H} \circ T^{-1}_{Alice}(u_1, \ldots, u_n)$, record as $(\tilde{h}_1, \ldots, \tilde{h}_m)$, then determine whether $(\tilde{h}'_1, \ldots, \tilde{h}'_m)$ and $(\tilde{h}_1, \ldots, \tilde{h}_m)$ are equal, if they are equal, then Bob will accept the signature of the message, if not, the signature is invalid and rejected.

Obviously, in the application of the new model on HFE, for the same message $(u_1, \ldots, u_m)$, the signature is change from the original $(v_1, \ldots, v_n)$ to $v_1, \ldots, v_n \| v_{g1}, \ldots, v_{gn}$. During verification, in addition to the original verification by using public key P, to verify whether $P(v_1, \ldots, v_n)$ is equal to $(u_1, \ldots, u_n)$, addition verification which is related to private key is required to determine whether $H \circ G^{-1} \circ S_{Alice}(v_1, \ldots, v_n)$ is equal to $H \circ S_{Alice}(v_{g1}, \ldots, v_{gn})$, and $\tilde{H} \circ T^{-1}_{Alice}(u_1, \ldots, u_m)$ is equal to $\tilde{H} \circ Q \circ G^{-1} \circ S_{Alice}(v_{g1}, \ldots, v_{gn})$.

All three equations must be verified in order to obtain that $v_1, \ldots, v_n \| v_{g1}, \ldots, v_{gn}$ is a correct signature. The scheme can effectively resist the key recovery attack, and has increased security level when compared to the original scheme.

One skilled in the art will understand that the embodiment of the present invention as shown in the drawings and described above is exemplary only and not intended to be limiting. It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A multivariate signature method for resisting Key Recovery Attack, characterized in that, the method comprises the steps of:

Step 1: selecting system parameters:

Taking a finite field F, positive integers n and m, a n-th extended field of F as $F^n$, a m-th extended field of F as $F^m$, taking a set of multivariable quadratic polynomial equations $q_1(x_1, \ldots, x_n), \ldots, q_m(x_1, \ldots, x_n)$ from $F^n$ to $F^m$ which is recorded as Q and then Q represents a center mapping of multivariate public key cryptographic system, where an input variable is n and an output variable is m, using $Q^{-1}$ for the inverse polynomial of polynomial Q, where $Q^{-1}$ is held by a legitimate user, taking another reversible affine transformation S and T on $F^n$ and $F^m$ as a secret key and their inverse polynomials are recorded as $S^{-1}$ and $T^{-1}$ respectively, then randomly selecting a set of n number n-quaternary multivariable polynomial equations $(g_1(x_1, \ldots, x_n), \ldots, g_n(x_1, \ldots, x_n))$ on $F^n$, where its polynomial vector is recorded as G, that is $G(x_1, \ldots, x_n) = (g_1(x_1, \ldots, x_n), \ldots, g_n(x_1, \ldots, x_n))$, and two unidirectional irreversible polynomial equations set H and $\tilde{H}$, wherein a user secret key consists of three parts, S, T and G, wherein H and $\tilde{H}$ are secret selection of a credible third party which is only used for generating public key, where the inverse polynomial of G is expressed as $G^{-1}$, the corresponding public key consists of five polynomials, which are: $P = T \circ Q \circ S$, $H \circ G^{-1} \circ S$, $H \circ S$, $\tilde{H} \circ Q \circ G^{-1} \circ S$, $\tilde{H} \circ T^{-1}$ respectively, where the operator $\circ$ represents a synthesis of operation, which is, processing substituting calculation from left to right in order;

Step 2: generating signature:

a coding of a known message M is vector $(u_1, \ldots, u_m)$ which is recorded as u, a signature is generated by the following steps:

(2.1) generating a forward signature:

(2.1a) substituting $u = (u_1, \ldots, u_m)$ which is the coding of message M into $T^{-1}$ by the secret key $T^{-1}$, obtaining $(y_1, \ldots, y_m)$, which is recorded as y;

(2.1b) substituting the obtained result y into the inverse polynomial $Q^{-1}$ of the center mapping Q, obtaining $(x_1, \ldots, x_n)$, which is recorded as x;

(2.1c) substituting the obtained result x into the inverse polynomial $S^{-1}$ of the secret key S, obtaining $(v_1, \ldots, v_n)$, which is recorded as v, then v is the forward signature of the coding u of the message M;

(2.2) generating a backward signature:

(2.2a) substituting the obtained result x into the secret key G, obtaining $G(x_1, \ldots, x_n) = (g_1(x_1, \ldots, x_n), \ldots, g_n(x_1, \ldots, x_n)) = (g_1, \ldots, g_n)$, which is recorded as g;

(2.2b) substituting the obtained result g into the inverse polynomial $S^{-1}$ of the secret key S, obtaining $S^{-1}(g) = S^{-1} \circ G(x) = (v_{g1}, \ldots, v_{gn})$, which is recorded as $v_g$, then $v_g$ is the backward signature of the coding u of the message M;

(2.3) processing a cascade of the forward signature and the back signature $v \| v_g$, which is the signature of the coding u of the message M;

Step 3, verifying the signature:

(3.1) using public key P to process verification:

(3.1a) substituting the forward signature $v = (v_1, \ldots, v_n)$ into the public key P, obtaining $P(v_1, \ldots, v_n) = (p_1(v_1, \ldots, v_n), \ldots, p_m(v_1, \ldots, v_n))$, obtaining and recording results as $u' = (u'_1, \ldots, u'_n)$;

(3.1b) determining if u' equals to the coding u of the original message M;

(3.2) using public key $H \circ S$ and $H \circ G^{-1} \circ S$ to process verification:

(3.2a) substituting the forward signature $v=(v_1, \ldots, v_n)$ into the public key $H \circ S$, obtaining $H \circ S(v) = H \circ S(v_1, \ldots, v_n) = H(S(v_1, \ldots, v_n))$, and recording obtained results as $h=(h_1, \ldots, h_n)$;

(3.2b) substituting the backward signature $v_g=(v_{g1}, \ldots, v_{gn})$ into the public key $H \circ G^{-1} \circ S$, obtaining $H \circ G^{-1} \circ S(v_g) = H \circ G^{-1} \circ S(v_{g1}, \ldots, v_{gn}) = H(G^{-1}(S(v_{g1}, \ldots, v_{gn})))$, and recording obtained results as $h'=(h'_1, \ldots, h'_n)$;

(3.2c) determining if $h$ and $h'$ are equal;

(3.3) using public key $\tilde{H} \circ Q \circ G^{-1} \circ S$ and $\tilde{H} \circ T^{-1}$ to process verification:

(3.3a) for the coding $u$ of the message M, substituting $u$ into the public key $\tilde{H} \circ T^{-1}$, obtaining $\tilde{H} \circ T^{-1}(u) = \tilde{H}(T^{-1}(u))$, and recording obtained results as $\tilde{h}=(\tilde{h}_1, \ldots, \tilde{h}_n)$;

(3.3b) for the backward signature $v_g$, substituting $v_g$ into the public key $\tilde{H} \circ Q \circ G^{-1} \circ S$, obtaining $\tilde{H} \circ Q \circ G^{-1} \circ S(v_g) = \tilde{H}(Q(G^{-1}(S(v_g))))$, recording obtained results as $\tilde{h}'=(\tilde{h}'_1, \ldots, \tilde{h}'_n)$;

(3.3c) determining if $\tilde{h}$ and $\tilde{h}'$ are equal;

if (3.1b), (3.2c) and (3.3c) are true, then $v \| v_g$ is a legitimate signature of the coding $u$ of the message M, otherwise, the signature is invalid and rejected.

2. The multivariate signature method for resisting Key Recovery Attack, characterized in that, in the step 1, all of the S, T, G are reversible affine transformation.

* * * * *